(12) United States Patent
Henson et al.

(10) Patent No.: US 7,574,390 B1
(45) Date of Patent: Aug. 11, 2009

(54) REVENUE SHARE INTEREST METHOD OF FINANCING AN ASSET MANAGEMENT FIRM

(75) Inventors: William Henson, Pelham, NY (US); Robert Jakacki, Chappaqua, NY (US); Norton Reamer, Boston, MA (US); Alexander von York, Stamford, CT (US)

(73) Assignee: Asset Management Finance LLC, New York, NY (US)

( * ) Notice: Subject to any disclaimer, the term of this patent is extended or adjusted under 35 U.S.C. 154(b) by 425 days.

(21) Appl. No.: 10/805,063

(22) Filed: Mar. 19, 2004
(Under 37 CFR 1.47)

(51) Int. Cl.
*G06Q 40/00* (2006.01)
(52) U.S. Cl. ........................ 705/36 R; 705/38
(58) Field of Classification Search ............. 705/35–38, 705/36 R
See application file for complete search history.

(56) References Cited

U.S. PATENT DOCUMENTS

| | | |
|---|---|---|
| 4,739,478 A | 4/1988 | Roberts et al. |
| 4,750,121 A | 6/1988 | Halley et al. |
| 4,997,188 A | 3/1991 | Nilssen |
| 5,774,880 A | 6/1998 | Ginsberg |
| 5,806,047 A | 9/1998 | Hackel et al. |
| 5,940,809 A | 8/1999 | Musmanno et al. |
| 5,946,667 A | 8/1999 | Tull, Jr. et al. |
| 6,154,730 A | 11/2000 | Adams et al. |
| 6,188,993 B1 | 2/2001 | Eng et al. |
| 6,253,191 B1 * | 6/2001 | Hoffman ............... 705/35 |
| 2001/0039500 A1 | 11/2001 | Johnson |
| 2002/0128951 A1 | 9/2002 | Kiron et al. |
| 2003/0204459 A1 | 10/2003 | Schulman |
| 2003/0204473 A1 | 10/2003 | Schulman |
| 2004/0024671 A1 | 2/2004 | Freund |
| 2006/0149562 A1 * | 7/2006 | Oyama ................ 705/1 |

OTHER PUBLICATIONS

Ketkar, Suhas and Dilip Ratha. "Recent Advances in Future-Flow Securitization." The Financier. 2004/2005; 11/12, p. 29.*
Cowley, Alex and J David Cummins. "Securitization of Life Insurance Assests and Liabilities." Journal of Risk and Insurance. Jun. 2005, 72, 2, p. 193.*
Norton H. Reamer (inventor), Remarks Delivered to the Boston Security Analysts Society on Jan. 25, 2005.

* cited by examiner

*Primary Examiner*—Hani Kazimi
*Assistant Examiner*—Daniel Kesack
(74) *Attorney, Agent, or Firm*—K&L Gates LLP; Stephen C. Glazier (57) ABSTRACT

In an embodiment of a method of financing an entity, such as an asset management firm, a financing provider invests assets in the entity. The financing provider receives a revenue share interest in the financed entity. No ownership interest in the entity is given to the financing provider during the term of the revenue share interest, and no debt is used. To evaluate and price the investment, a revenue forecasting model may be used.

12 Claims, 6 Drawing Sheets

REVENUE SHARE INTEREST METHOD OF FINANCING AN ASSET MANAGEMENT FIRM

BACKGROUND

1. Field

Embodiments of the present invention relate generally to financing asset management firms. More specifically, embodiments relate to revenue share interest methods for financing an asset management firm or any other financial services firm.

2. Description of Related Art

Asset management firms, also termed investment management firms, currently lack flexible solutions to their main finance needs. Such needs are often tied to pivotal events during their lifetime, including (1) succession, as founders retire and their equity is recycled; (2) restructuring, as financial investors or lenders are taken out; (3) buyout, as parent companies seek to spin out asset management units, and (4) other liquidity or capital needs for the firm or its owners.

Current finance solutions involve high levels of cultural and consensus risk. For instance, borrowing works in pure finance terms, but has acquired a stigma over the years. Few financiers are available, and the amount of firm value that can be monetized is low. Banks often demand recourse and restrictive covenants, which further interfere with the culture of the borrowers.

Additionally, selling a firm in whole or in part is public, final, and often controversial. A high sale price may be needed to compensate for client disruption and publicity. Moreover, cultural problems with the buyer are often insurmountable, particularly in a bear market. Internal inter-generational battles for value may be very stressful, particularly for smaller firms.

Experiences over time have demonstrated that venture investors rarely pay fair price for equity investments in asset management firms. High required returns for venture investors may force onerous terms from venture investment, usually in the form of "claw-backs" of increases in the value of the target firm. While their participation is sometimes discreet, many investors tarnish rather than enhance a firm's image. Management interaction with venture capitalists is often very uncomfortable, especially during tough economic times.

In the past, revenue sharing techniques have been combined with ownership during the term of the revenue share interest to secure financing for asset management firms. In return for financing the asset management firm, the financing entity immediately gains partial or, in some cases, total ownership of the asset management firm and a perpetual share of the firm's revenue stream. In many situations, such techniques may be fundamentally undesirable and unworkable, because they forfeit autonomy of the asset management firm, giving partial or complete control to the financing entity.

SUMMARY

The following summary is intended to describe certain embodiments of the present invention. It does not encompass each and every embodiment, and should not be construed as limiting of the present invention.

Embodiments of the present invention, for the first time, provide methods for financing an asset management firm, by using revenue share interests, without acquiring ownership during the term of the revenue share interest, and without using debt.

In an embodiment, an entity, such as an asset management firm, needs money to finance some aspect of its business, for example, a succession, restructuring, or buyout event. A financing provider enters into an agreement with the entity. Under the terms of the agreement, the financing provider agrees to give money to the entity. In return, the entity agrees to pay the financing provider a share of the entity's future revenue. The financing provider receives no ownership or other controlling interest in the entity during the term of the revenue share interest, and no debt is used.

The agreement may provide that the financing provider's revenue share interest expires after a specified time, is otherwise modified during the course of the agreement, or is a perpetual interest.

The financing provider's decision to enter into the agreement with the entity may be informed, evaluated, and priced by use of an analytical model with probabilistic aspects. In particular, the model may receive, as inputs, assumptions relating to the agreement terms, and factors impacting asset values over time. Among other things, the model may apply cash flow analyses (e.g., deterministic analysis, Monte Carlo analysis, and historical sampling analysis), added sensitivity analysis to stress the hypothetical investment, and discounted cash flow analyses. If model results do not meet objective underwriting guidelines, input assumptions may be modified, and the model re-run with the modified assumptions. As a practical matter, the financing provider's decision to enter into an agreement may also consider qualitative factors which fall outside the scope of a model.

Accordingly, embodiments herein provide an entity with the financing it needs, yet preserve the entity's independence and incentive to succeed. Moreover, embodiments provide new sound investment opportunities in the financial industry.

Various embodiments of the present invention are being developed by Asset Management Finance Corporation (New York, N.Y.).

DETAILED DESCRIPTION OF CERTAIN EMBODIMENTS

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

In an embodiment, a method of financing an entity, such as an asset management firm, is presented. A legal agreement involving the entity may be entered into. The agreement provides that a financing provider is to invest funds in the entity for use by the entity. Additionally, the agreement provides that, for a predetermined period of time, the financing provider or other specified party is to receive a predefined share of revenue generated by the entity (i.e., a "revenue share interest"). Pursuant to the agreement, no ownership interest in the entity is given to the financing provider or other specified party during the term of the revenue share interest. To assess the soundness of the potential investment, a probabilistic model-based analysis may be performed before the legal agreement is entered into. The term of the revenue share interest may be perpetual or for a fixed time with an expiration date, or otherwise terminate.

An embodiment of the present invention may have "optionality." For example, the term of the revenue share interest may be extended if certain revenue targets are not met, and the term may be shortened if certain revenue targets are exceeded. Other elements may also be adjusted in a similar manner. For example, the percentage of revenue taken by the revenue share interest may be increased if a quantitative target, such as the revenue growth rate, is missed, and may be decreased if a quantitative target is exceeded.

No debt is used in the financing of the target firm. That is, there is no fixed payment schedule, no interest, no amortization, and no obligation to repay a principal amount.

No ownership interest during the term of the revenue share interest is used in the financing of the target firm. The entity providing financing may become a partner of the financed firm during the term of the financing, to facilitate the revenue share interest, but this relationship carries no voting rights, no board representation, no management control, no distribution of profits, and does not constitute an ownership interest.

At the termination of the revenue share interest, the revenue share interest may convert to a nominal ownership interest held by the financing provider, callable by the financed firm (that is, the financed firm can buy the interest back).

The target financed firm may be an asset management firm, or any other financial services firm.

Figure 1:
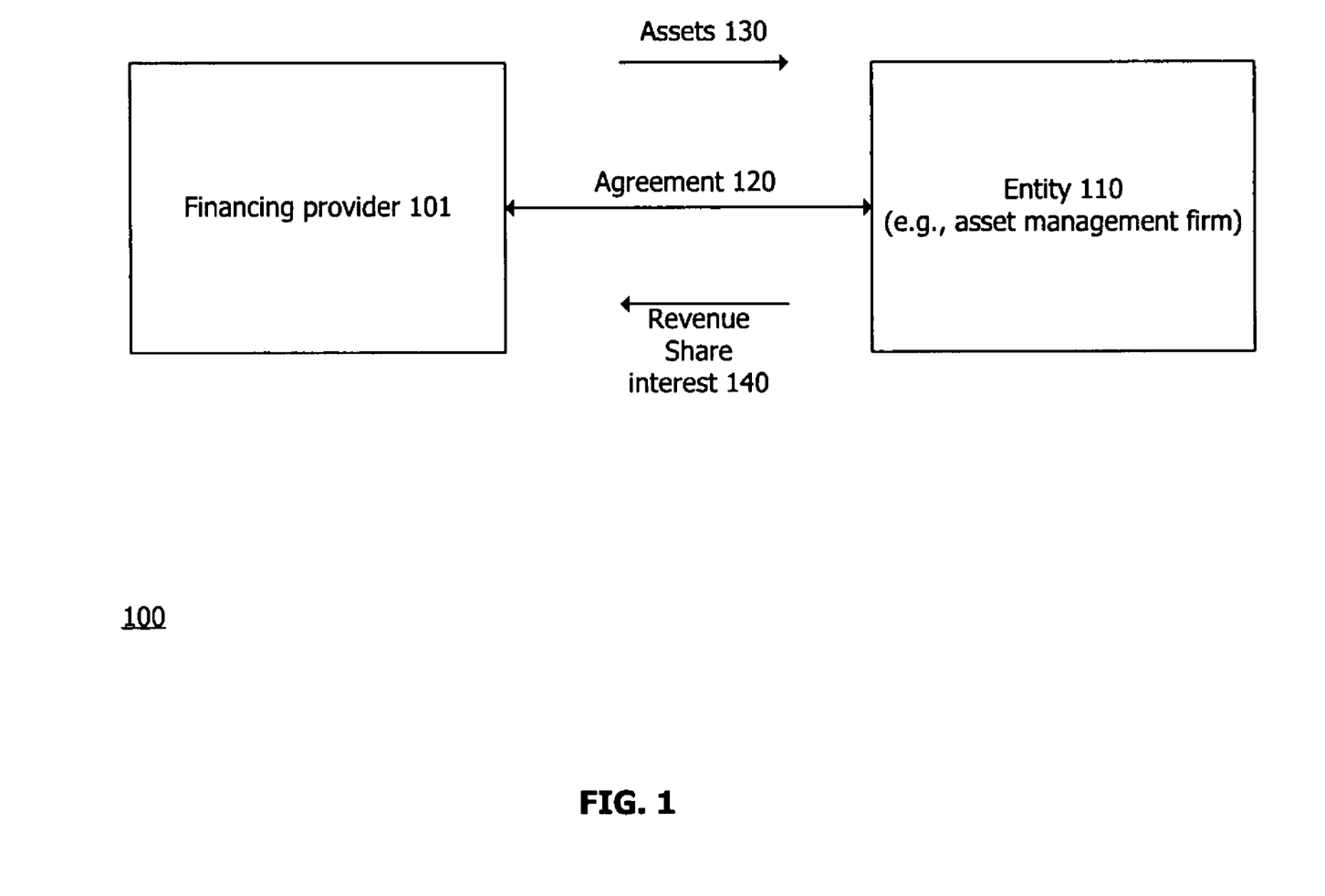
FIG. 1 shows an investment arrangement according to an embodiment of the present invention.

FIG. 1 shows an investment arrangement 100 according to an embodiment of the present invention. The arrangement 100 includes a financing provider 101 that enters into an agreement 120 with an entity 110, such as an asset management firm.

The financing provider 101 has money or other assets to invest in an entity, such as the entity 110. The entity 110 is in need of money or other assets for some reason, such as to fund a succession, restructuring, or buyout event. It is to be appreciated that the terms "financing provider" and "entity" are used herein in a generic sense to denote parties in the arrangement 100. Although some embodiments herein of the present invention focus on asset management firms, the present invention may be applied to other types of businesses.

The agreement 120 specifies that the financing provider 101 is to provide assets 130 to the entity 110. In turn, the entity 110 is to give the financing provider 101 a revenue share interest 140 in the entity 110. No ownership interest in the entity 110 is given to the financing provider 101 during the term of the revenue share interest.

The revenue share interest 140 may be expiring or perpetual. An expiring revenue share interest may have a fixed expiration date, or a variable date dependent upon actual revenue generated by the entity and/or other conditions. For instance, an arrangement providing for a ten-year term of revenue share interest may have provisions to shorten the term if minimum revenue requirements are met before ten years have passed. Conversely, the term may be extended if the requirements have not been met after ten years have passed.

Figure 2:
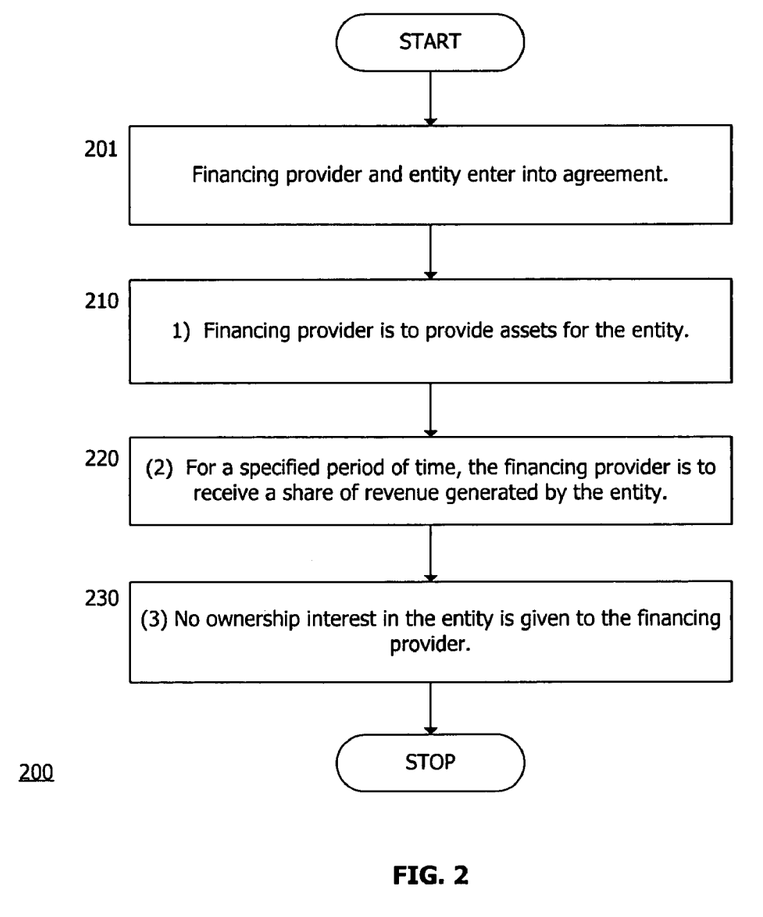
FIG. 2 shows an investment process according to an embodiment of the present invention.

FIG. 2 shows an investment process 200 according to an embodiment of the present invention. In task 201, a financing provider and entity enter into a legal agreement. The financing provider provides assets for the entity (task 210). For a specified period of time, the financing provider receives a share of revenue generated by the entity (task 220). No ownership interest in the entity is given to the financing provider (task 230), during the term of the revenue share interest.

The investment arrangements of FIGS. 1 and 2 and other embodiments may be employed to liquefy and diversify the position of entities in fragile situations, such as succession (e.g., a generational transfer of ownership), restructuring, or buyout situations. The investment arrangements may also be used to provide financing for other liquidity or capital needs of the firm or its owners. For instance, arrangements herein can be used to secure funds to pay off a retiring entity principal, as well as to spin off a money-making enterprise.

In an embodiment, a financing provider that is considering the investment arrangements herein may be particularly interested in mid-sized entities having certain desirable characteristics. Example characteristics for an asset management firm may include: a solid business history; current and expected profitability; a minimum term of consistent validated portfolio performance history; an intermediate-term financing need (e.g., succession, restructuring, buyout); and straightforward governance and structure (that is, for example, a founder in control, or a partnership).

The amount of financing that a financing provider is willing to provide to an entity may depend on various factors, the main factors being the term and percentage of the revenue share interest. Terms for this type of financing may include the amount of financing provided, the term of the revenue share interest, the percentage of the revenue share interest, the percentage of any final callable ownership interest, and the price of any such callable ownership interest. Hence, terms are a function of expected revenue over the term of the revenue share interest. In general, the terms may vary based on the expected revenue share interest and other factors. Further, the longer the term of the revenue share interest obtained, the more the financing provider can afford to finance, all else being equal. In general, the price may be different when the financing provider delivers the financing all up front, absorbing more risk. In some instances, the price may vary based on the optional use of an earn-out, wherein the financing provider agrees to make a future payment tied to measurable growth of the revenue of the entity. For instance, a financing provider may make a second payment of financing if sufficient revenue growth occurs over several years.

In an embodiment, the financing provider receives its share of revenues of the entity on a quarterly basis. The cash flow received by the financing provider can be used to service the provider's debt and to amortize the cost of the provider's revenue share interests. Therefore, an example strategy of the financing provider to realize profit is for the provider to hold its revenue share interests and receive cash.

In an embodiment, the financing provider can be bought out if a sale of the entity or its assets occurs. For instance, the financing provider may receive a share of the proceeds equal to its share of the cash flow sold to the buyer, adjusted for the remaining life of the investment and the entities performance since the inception of the agreement.

In other embodiments, a first agreement such as described herein may be followed up by one or more subsequent agreements between an entity and a financing provider. Such flexibility allows for continued investment in a growing entity, without a loss in entity independence. Such flexibility also permits a first departing partner and later a second departing partner in an asset management firm to monetize their respective holdings, for example.

Various quantitative underwriting criteria may be applied by the financing provider in evaluating an entity for a possible investment arrangement. Example criteria for the asset management industry may include: a minimum level of assets under management (AUM), a minimum period of performance history, a minimum value of a regression coefficient of determination (R-squared), domicile in the United States or Canada, transaction size within a specified minimum and maximum size, related leverage underwritten to a minimum standard, a minimum projected IRR (internal rate of return) on investment, client concentration limits, and investments structured so that the financing provider would not be required to consolidate the entity. Example client concentration limits may include: no one client more than X % of the asset manager's revenue, the top three clients no more than Y % of the asset manager's revenue, no single asset management firm more than Z % of the financing provider's revenue, and the three largest asset manager relationships no more than W % of the financing provider's revenue.

Various qualitative underwriting criteria also may be applied to an asset management firm. For instance, a new investment arrangement with an entity may be subject to one or more of the following guidelines and objectives: stability of entity management; limited client turnover at entity; entity compliance with investment styles and objectives; sufficiency and stability of entity cash flow and operating margins; consistency of entity revenue sources and rates; and overall financing provider diversity of investment styles, asset classes and industry/sector exposures.

The agreement between the financing provider and asset management firm may include various terms and conditions to appropriately safeguard the financing provider's investment. Example terms and conditions may include: employment and non-solicitation agreements from key employees; compliance with fundamental investment objectives; maintenance of core pricing economics; limitations on debt and guarantees; negative pledge on revenue and assets giving rise to revenue share interest; first priority of financing provider claim on its share of revenue; and restrictions on disposal of firm assets.

In assessing whether to invest in an entity as described herein and, if so, how much and under what terms and conditions, the financing provider may use a probabilistic model that examines, among other things, the underlying AUM of the entity, historical revenue performance (e.g., growth pattern, risk, volatility), client behavior, and other factors, to forecast the expected revenue stream of the entity, and therefore, the financing provider's forecasted return. This revenue forecast is then used as the basis to set the terms of the financing. Such a model may include prediction of possible revenue outcomes over time (e.g., the revenue share interest period), with a consideration of interdependent market conditions, performance relative to the market, market cycles, retention, loss, and gain of clients and shareholders, and moral and legal issues.

For instance, this quantitative model may predict that, given historical, current, and projected AUM of an entity, a financing provider has a 90% chance of achieving specified revenue growth goals (e.g., at least 10% revenue growth). If such a predicted result is not within the comfort level of the financing provider, then the terms of the hypothetical arrangement may be modified, that is, the terms may be modified.

In an embodiment, underwriting guidelines may require that the analytical approach has achieved some minimum probability of yielding a target rate of return.

The pricing ultimately agreed to by the financing provider may reflect the financing provider's return goals, as well as its tolerance of risk.

Figure 3:
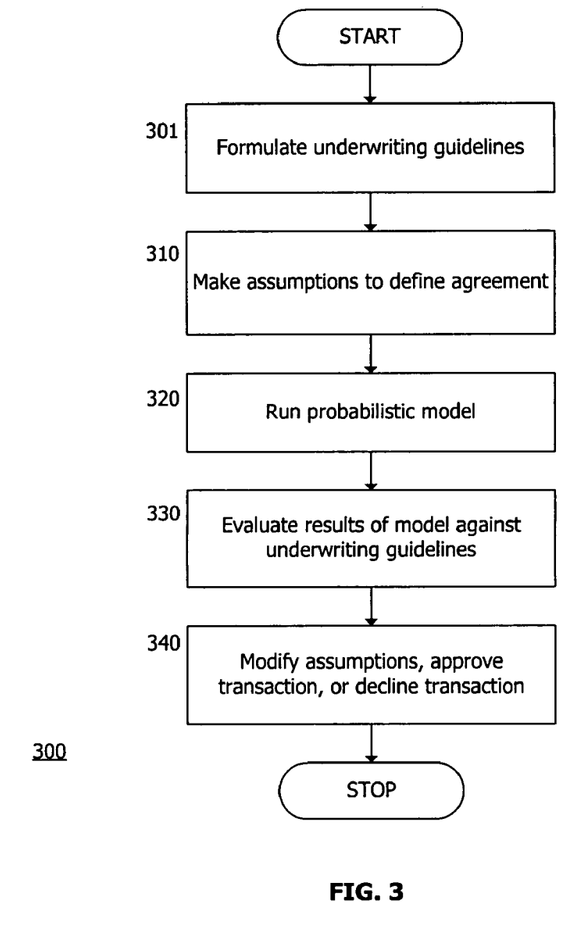
FIG. 3 shows an investment evaluation process according to an embodiment of the present invention.

FIG. 3 shows an investment evaluation process 300 according to an embodiment of the present invention. The process 300 may be used by a financing provider to help assess whether the firm should proceed with an agreement as described herein.

In task 301, the financing provider (or another entity) formulates underwriting guidelines by which the soundness of a potential investment may be objectively evaluated.

In task 310, the financing provider makes assumptions to define a hypothetical agreement. These assumptions are inputs to the probabilistic model (discussed below).

In task 320, the probabilistic model is run. In task 330, the results produced by the model are evaluated against the underwriting guidelines. In task 340, based on the evaluation, the assumptions may be modified and the model re-run. Alternatively, the proposed transaction may be approved or declined.

Figure 4A:
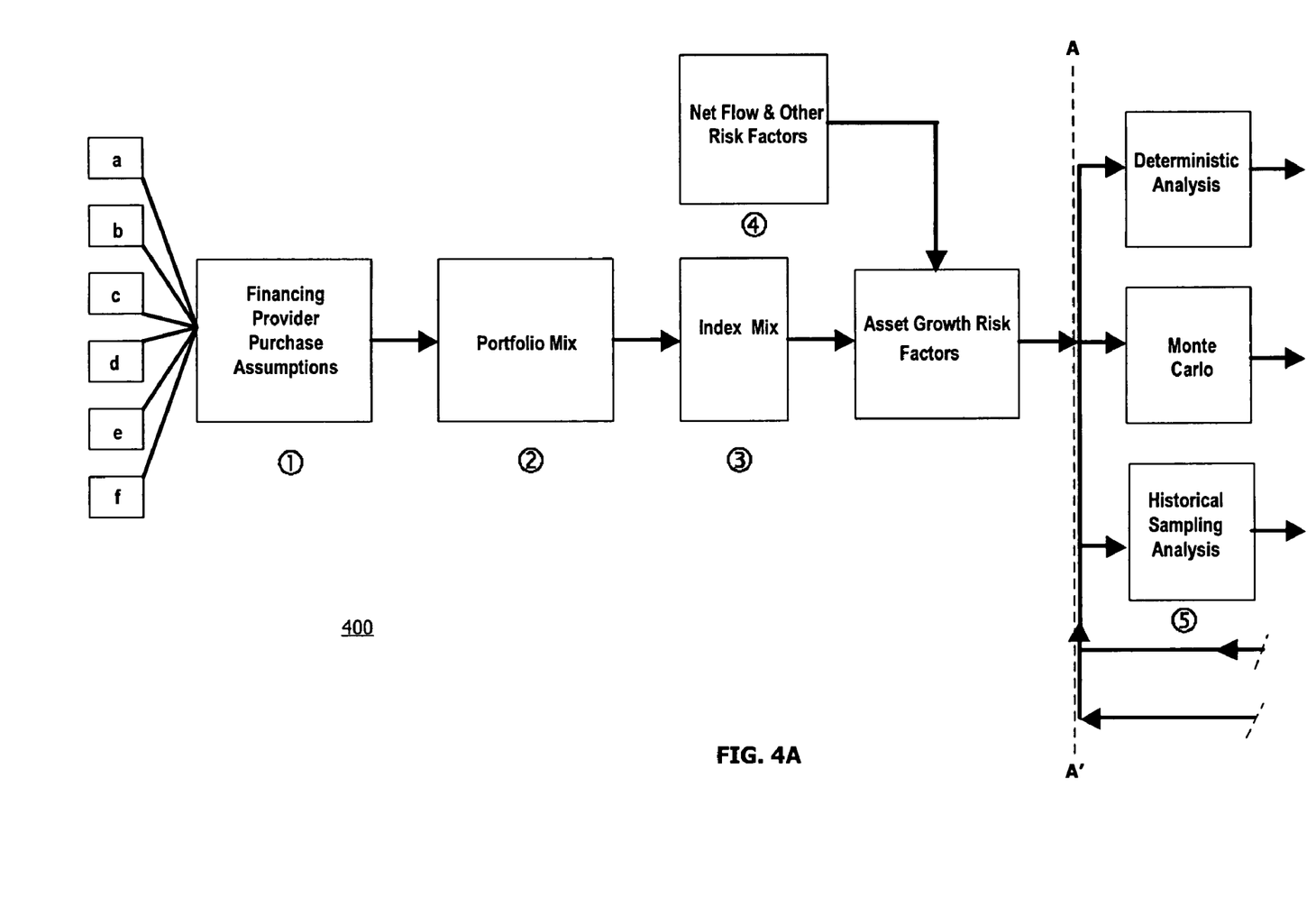
FIGS. 4A and 4B show a valuation and financing process according to an embodiment of the present invention.
Figure 4B:
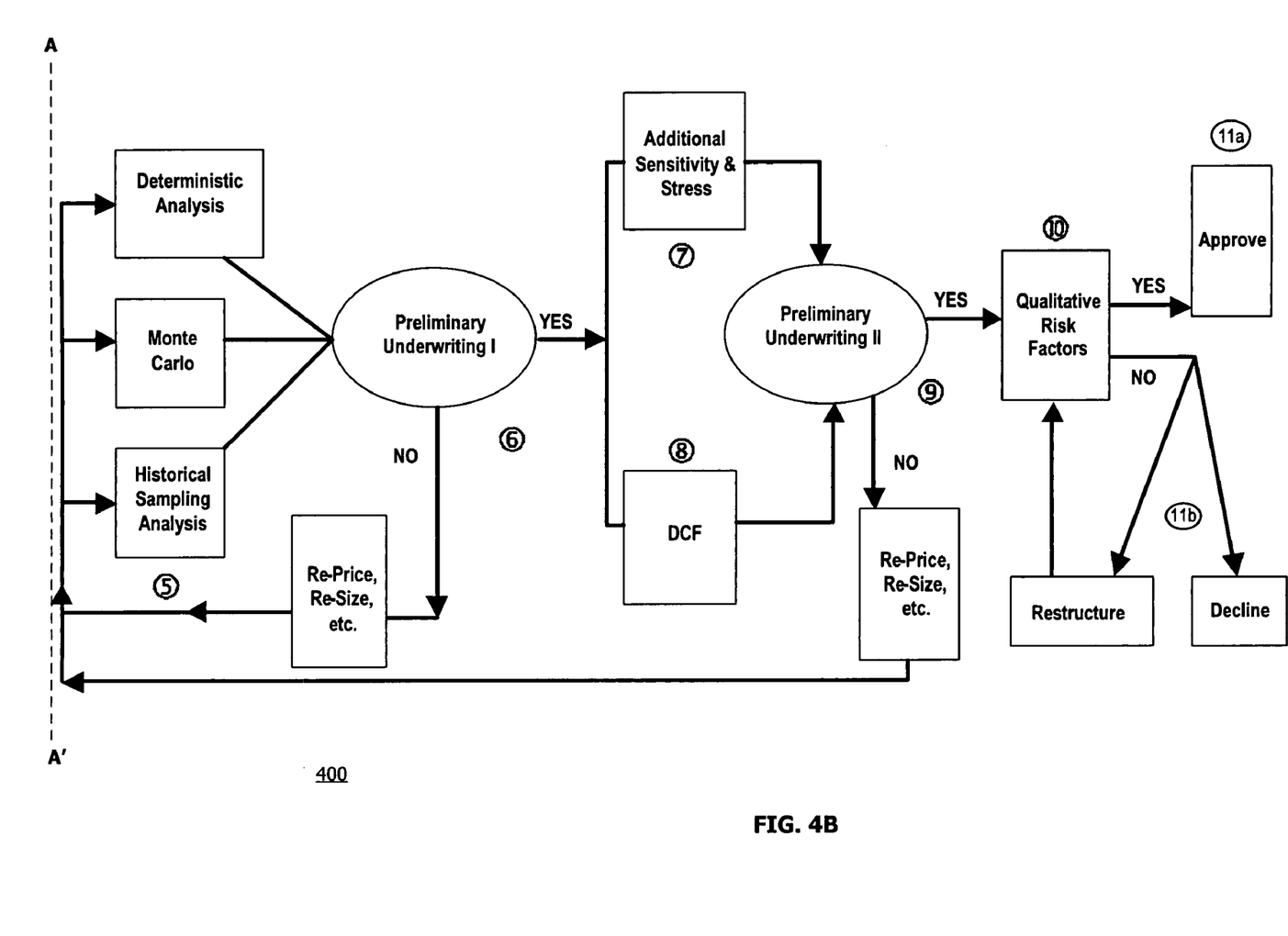

FIGS. 4A and 4B show an embodiment of a valuation and underwriting process 400 according to an embodiment of the present invention. The figures may be superimposed along the dashed line A-A' to depict the entire process. Various components of the process 400 are identified with circled numbers.

As shown in FIG. 4A, various assumptions (identified as letters 'a' through 'f') that define a hypothetical agreement between a financing provider and an entity are made and inputted into the model at (1). Example assumptions include management fee and revenue items, revenue share interest (RSI) percentage, term (e.g., expiring, perpetual, or variable expiring), proposed consideration, financing provider costs, and financing provider capital and return requirements.

The current asset mix of the entity is inputted at (2), and a constrained regression analysis correlating managed assets to indices is applied at (3). Net flows, distribution and reinvestment rates, and other asset growth risk factors are inputted at (4).

One or more cash flow analyses are applied at (5), which analyses determine probable outcomes over the life of the hypothetical investment for various scenarios. Example cash flow analyses include deterministic analysis, Monte Carlo analysis, and historical sampling analysis.

Referring next to FIG. 4B, after cash flow methodologies are executed, a first preliminary underwriting analysis is undertaken at (6). In particular, the process 400 determines whether the risk-return characteristics of the hypothetical investment comply with underwriting guidelines. If not, the investment is re-sized, or the terms of the RSI are modified, and the model is re-run with the new inputs.

If compliance with the risk-return characteristics is achieved at (6), then an added sensitivity analysis is applied at (7) to stress the hypothetical investment under various conditions. Example tests include deterministic growth rates, the replication of specific historic market or asset management firm environments, and shifts in asset mix. Similarly, the hypothetical investment may be examined at (8) under discounted cash flow (DCF) methodologies, where cash flows are projected using expected asset growth rates.

A second preliminary underwriting analysis is undertaken at (9). If the amount of the hypothetical investment does not produce acceptable results in either the sensitivity tests (7) or the DCF approach (8), the investment may be re-sized, or the terms of the RSI modified, and the model then re-run with the new inputs.

A qualitative financing assessment is made at (10). For instance, management, litigation, and documentation issues with respect to the entity may be considered. If the qualitative assessment is positive, then the transaction is approved at (11a), and the agreement can be finalized. If negative, then at (11b) the investment is declined. Alternatively, the investment is restructured to address the concerns highlighted by the qualitative assessment.

Figure 5:
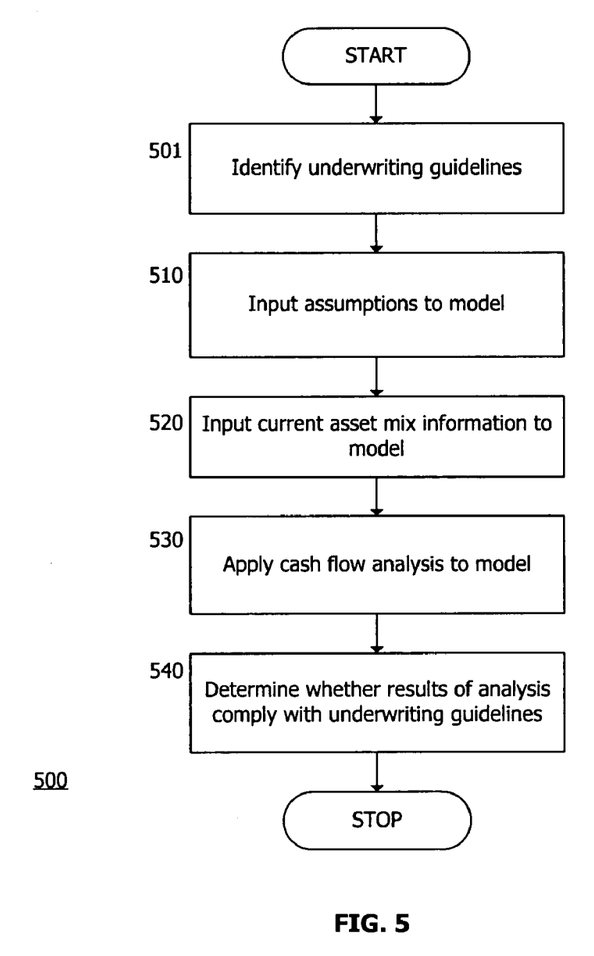
FIG. 5 shows a valuation and financing process according to an embodiment of the present invention.

FIG. 5 shows an embodiment of a valuation and financing process 500 according to an embodiment of the present invention. In task 501, underwriting guidelines are identified to serve as a metric for assessing a potential investment arrangement between a financing provider and an asset management firm. In task 510, assumptions are inputted to a model, such as assumptions discussed above in connection with FIGS. 4A and 4B.

In task 520, current asset mix information regarding the asset management firm is inputted into the model. A cash flow analysis is applied to the model in task 530, and in task 540, it is determined whether the results of that analysis comply with the identified underwriting guidelines. That determination can help decision makers decide whether to pursue the investment arrangement as proposed, modify the proposed arrangement, or abandon the effort entirely. Additional analyses may be undertaken, such as those described above.

In an example embodiment, analytical processes described herein may be implemented using Microsoft Visual Basic and Microsoft Excel running on a computer, such as a personal computer or a laptop. Such an open architecture may facilitate auditing of processes applied by a financing provider. Existing analytical frameworks (e.g., style analysis) or third party software (e.g. Ibbotson Encorr) may be employed for various analytical components. Datasets for analysis may be obtained from various sources, such as, for example, Morningstar, PSN, and Ibbotson & Associates.

In an embodiment, the financing provider enters into investment arrangements with numerous entities in need of capital. The financing provider considers risks and benefits associated with particular entities, but also considers an aggregated picture of its investments, seeking broad diversification among entities.

The foregoing description of the various embodiments of the present invention is provided to enable any person skilled in the art to make and use the present invention and its embodiments. Various modifications to these embodiments are possible, and the generic principles presented herein may be applied to other embodiments as well.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include data bases, as well as memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

What is claimed:

1. A method using a computer of financing by a financier of an asset management firm by obtaining a revenue share interest in the asset management firm, and excluding the financier from taking an ownership interest during a predetermined period of time of the revenue share interest, and excluding debt, the method comprising:
   negotiating terms for obtaining a revenue share interest in the asset management firm, wherein the revenue share interest is a portion of the revenue derived from asset management,
   providing financing by the financier to the asset management firm,
   receiving a revenue share interest for the predetermined period of time,
   wherein, no ownership interest in the asset management firm is received during the predetermined period of time of the revenue share interest, and no debt is used, and
   evaluating the revenue share interest using the computer, which at least in part is using a probabilistic analytical model.

2. The method of claim 1, wherein the financing is provided to the asset management firm in connection with a succession, restructuring, buyout event or other liquidity or capital needs of the firm or its owners.

3. The method of claim 1, further comprising:
   terminating the revenue share interest at the end of the predetermined period of time, and upon termination of the revenue share interest, converting the revenue share interest to an ownership interest in the asset management firm, callable by the asset management firm.

4. The method in claim 1, further comprising:
   changing a term of the revenue share interest based on a comparison of actual business performance to a quantitative target level.

5. The method in claim 1, wherein the negotiated terms include one or more of a fixed expiration date, a variable expiration date, a perpetual revenue share interest, a percentage of a callable ownership interest, a price of a callable ownership interest, an amount of financing, one or more earn-outs, a payment schedule, one or more buyout provisions, one or more required employment agreements for one or more employees, one or more required non-solicitation agreements for one or more employees, one or more objectives, pricing economics, one or more debt limitations, one or more debt guarantees, one or more negative pledges on revenue, one or more negative pledges on assets, priority, or one or more asset disposal restrictions.

6. The method of claim 1, wherein the terms depend on revenue targets.

7. The method in claim 6, further comprising:
extending the predetermined period of time of the revenue share interest, if the revenue targets are not met, and
reducing the predetermined period of time of the revenue share interest, if the revenue targets are exceeded.

8. The method in claim 6, further comprising:
increasing the amount of the revenue share interest if revenue targets are not met, and
decreasing the amount of the revenue share interest, if revenue targets are exceeded.

9. A method using a computer of financing by a financier of a business by obtaining a revenue share interest in the business, and excluding the financier from taking an ownership interest during a predetermined period of time of the revenue share interest, and excluding debt, the method comprising:
negotiating terms for obtaining a revenue share interest in the business, wherein the revenue share interest is a portion of the revenue derived from the business,
providing financing by the financier to the business,
receiving a revenue share interest for a predetermined period of time,
wherein, no ownership interest in the business is received during the predetermined period of time of the revenue share interest, and no debt is used, and
evaluating the revenue share interest using the computer, which at least in part is using a probabilistic model.

10. The method in claim 9, wherein the business is one of an asset management firm, or any other financial services firm.

11. The method in claim 9, wherein the negotiated terms include one or more of a fixed expiration date, a variable expiration date, a perpetual revenue share interest, a percentage of a callable ownership interest, a price of a callable ownership interest, an amount of financing, one or more earn-outs, a payment schedule, one or more buyout provisions, one or more required employment agreements for one or more employees, one or more required non-solicitation agreements for one or more employees, one or more objectives, pricing economics, one or more debt limitations, one or more debt guarantees, one or more negative pledges on revenue, one or more negative pledges on assets, priority, or one or more asset disposal restrictions.

12. A method using a computer of financing by a financier of an asset management firm by obtaining a revenue share interest in the asset management firm, and excluding the financier from taking an ownership interest during a predetermined period of time of the revenue share interest, and excluding debt, the method comprising:
negotiating terms for obtaining a revenue share interest in the asset management firm,
providing financing by the financier to the asset management firm,
receiving a revenue share interest for a predetermined period of time, wherein the revenue share interest is a predefined share of the revenue of the asset management firm,
evaluating the revenue share interest using a computer which at least in part is using a probabilistic analytical model,
extending the predetermined period of time of the revemie share interest, if revenue targets are not met,
reducing the predetermined period of time of the revenue share interest, if revenue targets are exceeded,
increasing the amount of the revenue share interest if revenue targets are not met,
decreasing the amount of the revenue share interest, if revenue targets are exceeded, and
changing a term of the revenue share interest based on a comparison of actual business performance to a quantitative target level,
wherein no ownership interest in the asset management firm is received by the financier during the predetermined period of time of the revenue share interest, and no debt is used, and wherein the financing is provided to the asset management firm in connection with a succession, restructuring, buyout event or other liquidity or capital needs of the firm or its owners.

* * * * *